United States Patent
Ohkuma et al.

[11] Patent Number: 6,007,453
[45] Date of Patent: Dec. 28, 1999

[54] TORQUE SPLITTING DEVICE USING HYDRAULIC CLUTCHES

[75] Inventors: Shinji Ohkuma; Naoki Yajima; Tetsushi Asano, all of Wako, Japan

[73] Assignee: Honda Giken Kogyo Kabushiki Kaisha, Tokyo, Japan

[21] Appl. No.: 08/944,464

[22] Filed: Oct. 6, 1997

[30] Foreign Application Priority Data

Nov. 7, 1996 [JP] Japan .................................... 8-294757
Nov. 8, 1996 [JP] Japan .................................... 8-296480

[51] Int. Cl.$^6$ ............................ B60K 41/02; F16H 59/60
[52] U.S. Cl. ................................ 477/76; 477/97; 475/117
[58] Field of Search ............................ 180/197; 477/35, 477/98, 76, 97; 475/86, 117

[56] References Cited

U.S. PATENT DOCUMENTS

| | | | |
|---|---|---|---|
| 4,727,966 | 3/1988 | Hiramatsu et al. | 180/249 X |
| 5,259,476 | 11/1993 | Matsuno et al. | 180/197 |
| 5,611,752 | 3/1997 | Kamada et al. | 477/98 |
| 5,692,987 | 12/1997 | Shibahata et al. | 475/204 |
| 5,700,226 | 12/1997 | Droste | 477/156 |
| 5,709,627 | 1/1998 | Teraoka | 477/35 X |
| 5,813,939 | 9/1998 | Masumoto et al. | 475/35 |

*Primary Examiner*—Richard M. Lorence
*Assistant Examiner*—Roger Pang
*Attorney, Agent, or Firm*—Skjerven, Morrill, MacPherson, Franklin & Friel LLP; Alan H. MacPherson

[57] ABSTRACT

An improvement is made to a torque splitting device employing hydraulic clutches so as to avoid any discontinuity in the control even when the properties of the actuating oil such as the pressure and temperature thereof deviate from standard values. For instance, when the oil temperature is low, the target value of the oil pressure for each of the clutches is modified to a lower value. Thus, it becomes possible to make less pronounced any delay in the response of the torque splitting device which may arise due to the sluggishness of the oil as it flows out of the clutch cylinder. The oil pump is typically actuated by a member rotating at a speed proportional to the vehicle speed, and the pressure output of the pump may be inadequate in a low speed range. In such a case, the target value is again reduced so as to reduce any abrupt change in the property of the torque splitting device when the vehicle is accelerated from a low speed. Because the pressure output of the pump normally drops as the oil temperature rises, it is desirable to take into account the oil temperature in this control action as well.

2 Claims, 10 Drawing Sheets

TORQUE SPLITTING DEVICE USING HYDRAULIC CLUTCHES

TECHNICAL FIELD

The present invention relates to a torque splitting device for changing the torque distribution ratio to right and left axles or front and rear axles of a vehicle depending on the operating condition of the vehicle.

BACKGROUND OF THE INVENTION

The applicant has previously proposed, for instance in Japanese patent laid-open publication No. 8-21492 which corresponds to the U.S. patent application Ser. No. 08/497,557 filed Jun. 30, 1995, a torque splitting device which, provided in parallel with a conventional differential device, controls the simulated rolling resistance to each of the right and left or front and rear axles and boosts the rotational speed of the axle encountering a lower rolling resistance. Thereby, the torque distribution ratio to the right and left axles can be positively changed depending on the steering wheel steering angle and the vehicle speed to the end of improving the steering performance of the vehicle. The contents of the above mentioned United States patent application are hereby incorporated in this application by reference.

As illustrated in FIG. 10, this previously proposed torque splitting device T comprises an oil pressure pump 32 producing an output pressure that depends on the vehicle speed, a regulator Re for adjusting the output pressure to a prescribed level, a pair of wet hydraulic multi-disk clutches Ca and Cd for producing simulated rolling resistances, a pressure regulating valve 30 consisting of a linear solenoid valve for determining a torque distribution ratio for the right and left (or front and rear) wheels according to the turning radius or the road resistance, and controlling the engagement forces of the clutches Ca and Cd so as to achieve a desired torque distribution ratio by adjusting the oil pressure for each of the clutches to a target value, an electronic control unit 29 for computing the target oil pressures, and controlling the electric current for the pressure regulating valve 30, and a planetary gear mechanism P which is connected to the wet hydraulic multi-disk clutches Ca and Cd and actually distributes the torque. The output of the engine E forwarded to the torque splitting device T via the transmission TM can be thus appropriately distributed to the right and left (or front and rear) axles 5L and 5R depending on the operating condition of the vehicle.

The operating response of such a clutch is affected by the viscosity of the actuating oil, and tends to drop under a low temperature condition because of an increase in viscosity. Because the clutch is typically disengaged by removal of the actuating oil from the clutch cylinder, the response delay is particularly significant when disengaging the clutch under a low temperature condition. The reduction in the response of the clutch due to an increase in the flow resistance to the actuating oil means that the difference in rotational speed between the right and left wheels may remain even after the steering wheel is brought back to the neutral position. This is not desirable because it causes discomfort to the vehicle operator.

Also, because the output of the oil pressure pump depends on the vehicle speed, the oil pressure pump may not be able to produce a sufficient oil pressure to appropriately operate the wet hydraulic multi-disk clutch in a low speed range. The volumetric efficiency of the oil pressure pump, which typically consists of a gear pump or a cam pump using a trochoidal or other piston element, is known to be affected by the viscosity or the temperature of the oil. When the oil temperature is high, and the viscosity of the oil is therefore low, the volumetric efficiency of the oil tends to drop. Therefore, for instance when a certain oil pressure target value is supplied to the pressure control valve so as to create a certain difference in the driving force between the right and left wheels to accommodate a turning maneuver, the oil pressure pump may not be able to produce the required oil pressure if the rotational speed of the engine is low and/or the oil temperature is high. Under such a condition, when the rotational speed of the oil pressure pump is accelerated from a low speed range involving an insufficient output pressure of the pump, it is possible for the wet hydraulic multi-disk clutch to abruptly engage as soon as the output pressure of the pump reaches a prescribed value. This means a discontinuity in the torque distribution control, and is not desirable again as it causes a discomfort to the vehicle operator.

BRIEF SUMMARY OF THE INVENTION

In view of such problems of the prior art, a primary object of the present invention is to provide a torque splitting device using at least one hydraulic clutch which can maintain a satisfactory control action even when the property of the oil is not suitable for a normal operation of the clutch.

A second object of the present invention is to provide a torque splitting device which can operate satisfactorily even when the oil temperature is excessively low.

A third object of the present invention is to provide a torque splitting device which can operate satisfactorily even when the rotational speed of the oil pump for providing an oil pressure for the clutch is so low that the oil pressure for the clutch is inadequate.

A fourth object of the present invention is to provide a torque splitting device which is economical and can operate satisfactorily virtually under all conditions.

A fifth object of the present invention is to provide a torque splitting device which can ensure a smooth control action without regard to the condition of the actuating oil.

According to the present invention, these and other objects can be accomplished by providing a torque splitting device for distributing an input torque applied to an input member to a pair of output members at an adjustable distribution ratio, comprising: a torque splitting mechanism including at least one hydraulically actuated clutch for controlling a torque distribution ratio to the two output members; an oil circuit for supplying actuating oil to the clutch including a regulating valve for controlling a pressure of the actuating oil supplied to the clutch; a sensor for detecting an actuating property of the actuating oil; and a control unit for controlling the torque distribution ratio via the regulating valve according to a prescribed control schedule; the control unit being adapted to modify the control schedule according to an output from the sensor. Typically, the torque distribution ratio is achieved by changing a rotational speed of at least one of the output members.

One of the important actuating properties of the oil is its temperature. When the temperature is low, and the oil therefore encounters a relatively high flow resistance, particularly as it flows out of the clutch, a certain delay may be produced in the response of the system when disengaging the clutch. In that case, a target value for the pressure of the actuating oil supplied to the clutch may be reduced from a normal value so that the response delay becomes less pronounced. This is useful, for instance, when the torque splitting device is applied for distributing engine output torque to right and left wheels to improve the turning behavior of the vehicle. When the steering angle is brought back to the neutral position after making a turning maneuver, if the normal control schedule is applied, the difference in rotational speed between the right and left wheels may remain even after the steering wheel is brought back to the neutral position. Therefore, by controlling the pressure supplied to the clutch when the oil temperature is low, it is possible to avoid any problems associated with the delay in expelling oil from the hydraulic clutch.

For instance, a torque limiting coefficient by which the target value of the actuating oil pressure is modified may be selected so as to be substantially proportional to the oil temperature when the oil temperature is below a prescribed value, and becomes substantially equal to one when the oil temperature is equal to or higher than the prescribed value.

Another important property of the actuating oil is its pressure. The pressure for the actuating the clutch is normally produced from a pressure source typically consisting of a pump which is actuated at a variable speed, for instance corresponding to a vehicle speed, and may not be adequate for properly engaging the clutch particularly when the speed by which the pump is actuated is too low. This typically occurs when a vehicle equipped with a torque splitting device is travelling at a low speed. In such a case, the pressure for the clutch may be inadequate and the clutch may not be as tightly engaged as intended. When the pump or the vehicle is accelerated from such a state, the resulting increase in the pressure output of the pump may cause an abrupt engagement of the clutch, and may cause some discomfort to the operator. To avoid this from occurring, a target value for the pressure of the actuating oil supplied to the clutch may be reduced from a normal value when the actuating speed of the pump is lower than a normal value. This becomes particularly pronounced when the oil temperature is high and the viscosity of the oil is low because the pump typically consisting of a gear pump or a cam pump loses its volumetric efficiency under such a condition.

According to a preferred embodiment of the present invention, a torque limiting coefficient by which the target value of the actuating oil pressure is modified is selected so as to be substantially proportional to the vehicle speed when the vehicle speed is below a prescribed value, and becomes substantially equal to one when the vehicle speed is equal to or higher than the prescribed value, the prescribed value of the vehicle speed being increased from a standard value when the oil temperature is higher than a normal value.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
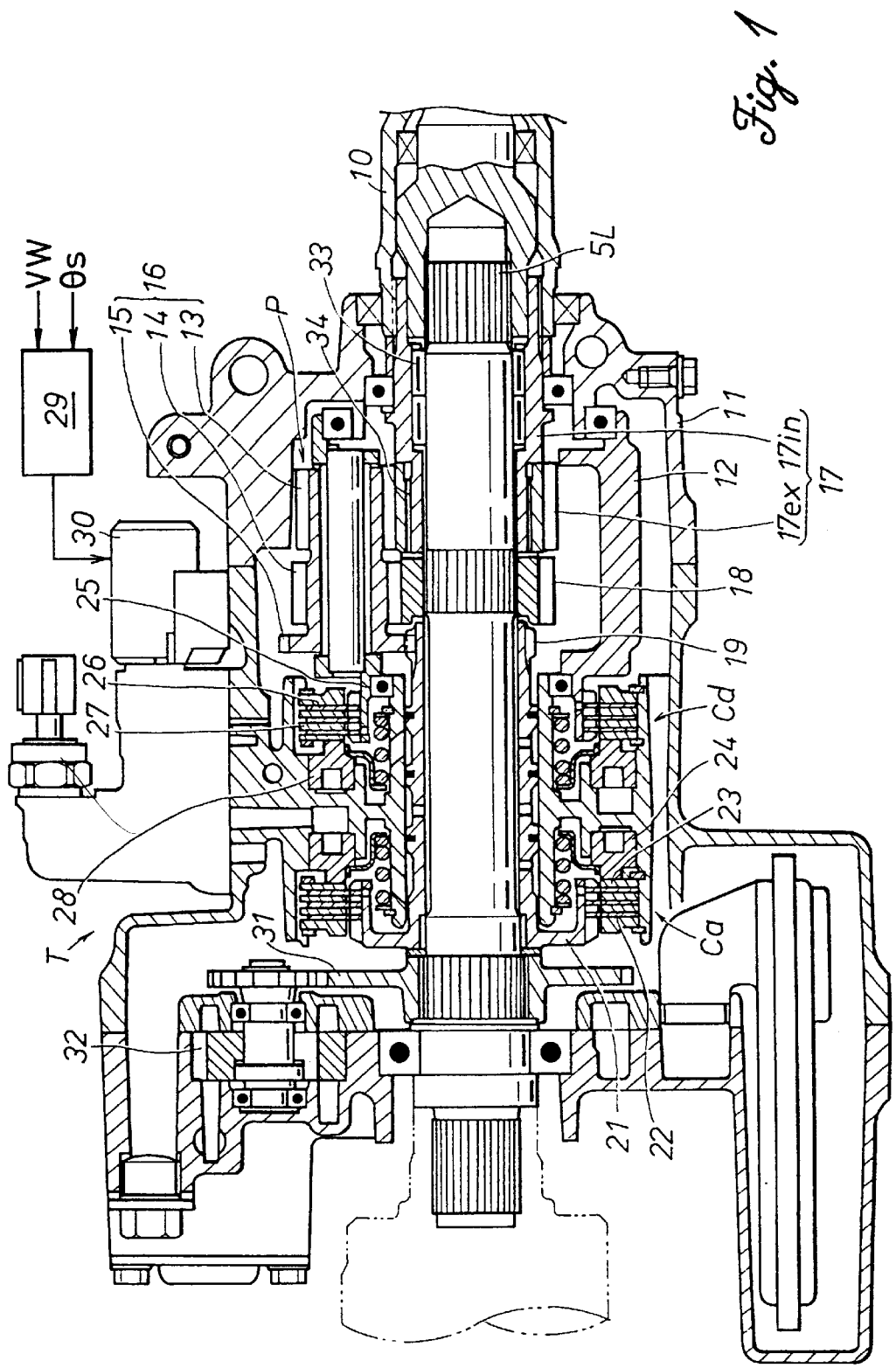
FIG. 1 is a longitudinal sectional view of a torque splitting device for distributing an input torque to right and left axles of a vehicle embodying the present invention.
Figure 2:
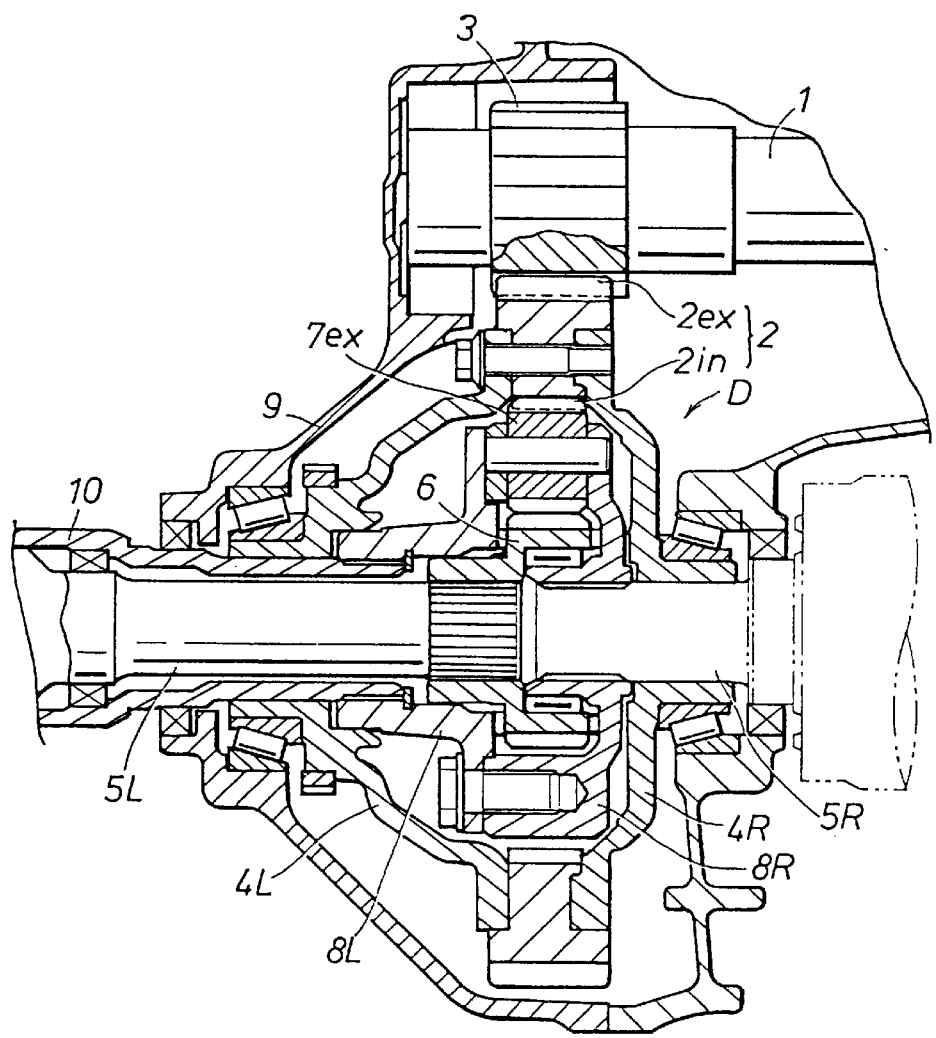
FIG. 2 is a longitudinal sectional view of a differential device which is connected to the torque splitting device of FIG. 1.

First of all, the torque splitting device to which the present invention is applied is described with reference to FIGS. 1 and 2. This torque splitting device T is connected to an output shaft 1 of a transmission to which the engine output is transmitted, via a differential device D which is illustrated in FIG. 2.

The differential device D consists of a double pinion type planetary gear mechanism, and comprises a driven member 2 which includes an external teeth gear 2ex meshing with an output gear 3 provided on an axial end of the output shaft 1 of the transmission, and an internal teeth gear 2in formed integrally with the external teeth gear 2ex, differential casing halves 4L and 4R which are joined together by threaded bolts interposing the driven member 2 between them, right and left output shafts 5L and 5R which are rotatably passed through central holes of the differential casing halves 4L and 4R, respectively, a sun gear 6 which is spline coupled to an axial end of the left output shaft 5L, outer pinions 7ex which each mesh with the internal teeth gear 2in of the driven member 2 and rotate around both itself and the sun gear 6, inner pinions 7in (see FIG. 3; the inner pinions 7in do not appear in FIG. 1) which each mesh with the outer pinions 7ex and the sun gear 6 and rotate around both itself and the sun gear 6, and right and left planetary carriers 8L and 8R which rotatably support the inner and outer pinions 7in and 7ex. Central parts of the right and left differential casings 4L and 4R are supported by a transmission housing 9, for instance by roller bearings. The right planetary carrier 8R pivotally supports the sun gear 6 via a needle bearing, and is spline coupled to an axial end of the right output shaft 5R. The left planetary carrier 8L surrounds the left output shaft 5L, and is spline coupled to the right end of a sleeve 10 passed through the central hole of the left differential casing 4L.

In this differential device D, the driven member 2 serves as an input element, and the sun gear 6 which serves as one of two output elements, is connected to the left front wheel WFL via the left output shaft 5L while the right planetary carrier 8R which serves as the other output element is connected to the right front wheel WFR via the right output shaft 5R. A drive shaft equipped with a known isokinetic coupling is interposed between the left output shaft 5L and the left front wheel WFL, and between the right output shaft 5R and the right front wheel WFR.

The torque splitting device T consists of a planetary gear mechanism P, and clutches Ca and Cd for acceleration and deceleration each consisting of a wet hydraulic multi-plate clutch.

The planetary gear mechanism P of the torque splitting device T comprises a planetary carrier 12 pivotally supported by a casing 11 so as to surround the left output shaft 5L, a plurality (for instance four) of triple pinion members 16 which each integrally combine a first pinion 13, a second pinion 14 and a third pinion 15, and pivotally supported along a circle concentric to the center of the planetary carrier, a first sun gear 17 pivotally supported around the left output shaft 5L and meshes with the first pinion 13, a second sun gear 18 which is spline coupled to the outer circumference of the left output shaft 5L at a point immediately left of the first sun gear 17, and a third sun gear 19 which is integral with an inner plate retaining member 21 of the acceleration clutch Ca and meshes with the third pinion 15. The inner plate retaining member 21 is pivotally supported around the left output shaft 5L.

The first sun gear 17 is spline coupled to the left end of the sleeve 10 which is in turn spline coupled to the left planetary carrier 8L of the differential device D so as to integrally rotate with the planetary carriers 8L and 8R and the right output shaft 5R of the differential device D.

The acceleration clutch Ca couples inner plates 22, which are axially slidably engaged by the inner plate retaining member 21 pivotally mounted on the left output shaft 5L, with outer plates 23, which are axially slidably engaged by an inner surface of the casing 11, with the thrust force of an annular hydraulic piston 24, and performs the function of arresting the rotation of the third sun gear 19 which is integral with the inner plate retaining member 21.

The deceleration clutch Cd couples inner plates 26, which are axially slidably engaged by an inner plate retaining member 25 formed in the planetary carrier 12, with outer plates 27, which are axially slidably engaged by an inner surface of the casing 11, with the thrust force of an annular hydraulic piston 28, and performs the function of arresting the rotation of the triple pinion members 16, which are pivotally supported by the planetary carrier 12, around the sun gears.

The engagement forces of the acceleration and deceleration clutches Ca and Cd are controlled by the oil pressure supplied thereto from a gear pump 32, driven by a spur gear 31 spline coupled to the left output shaft 5L, via an oil pressure circuit including a pressure regulating valve 30. The pressure regulating valve 30 is controlled by an electronic control unit 29 receiving a vehicle speed VW and a steering angle θs as data.

Figure 3:
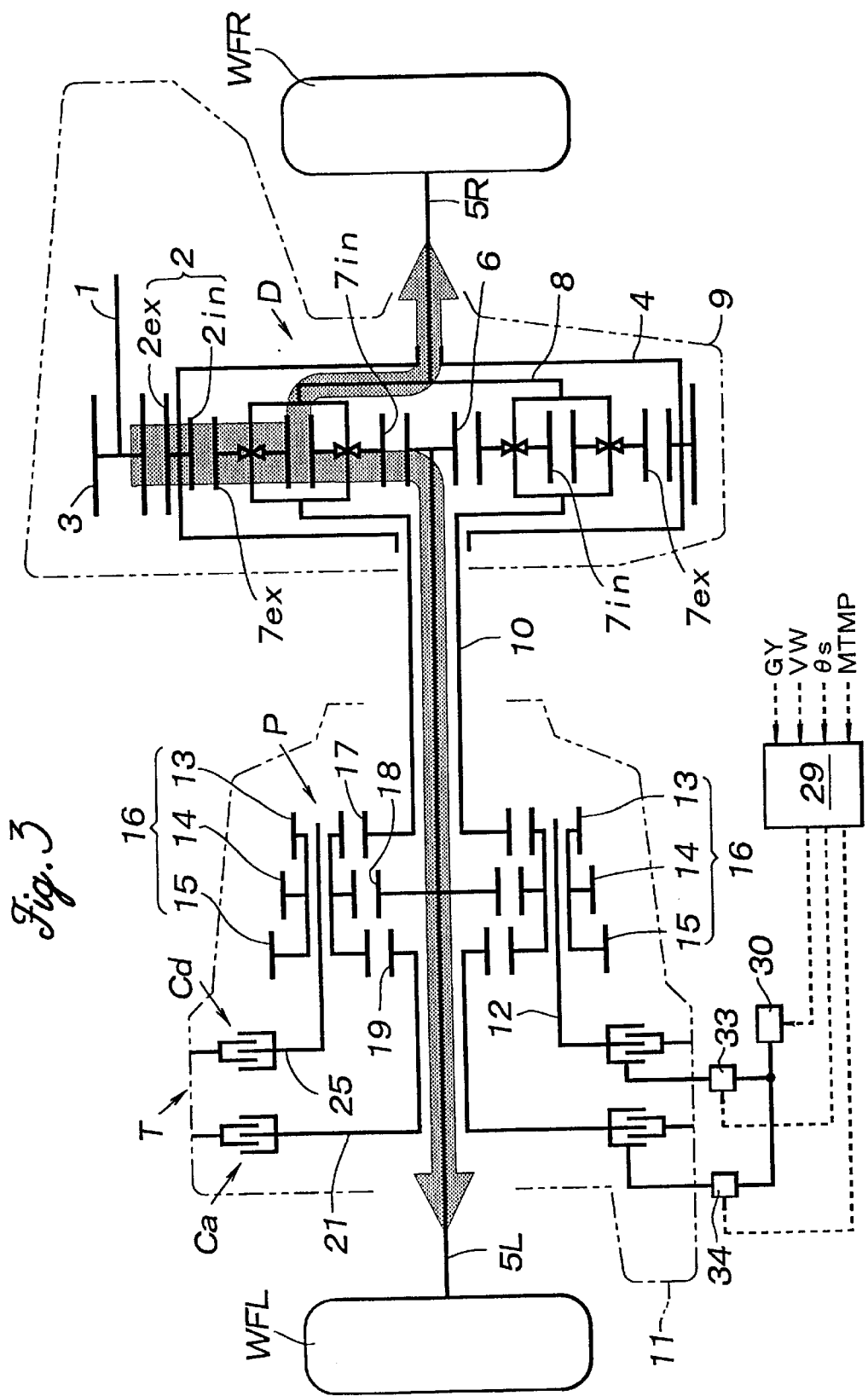
FIG. 3 is a skeleton diagram of a power transmission system of a front engine, front drive vehicle.

Now the operation of this device is described in the following with reference to FIGS. 3 to 5.

When the vehicle is traveling straight ahead, the deceleration and acceleration clutches Cd and Ca are both disengaged. As a result, the planetary carrier 12 and the third sun gear 19 of the torque splitting device T are both allowed to move freely, and the left output shaft 5L, the right output shaft 5R, the planetary carrier 8 of the differential device D, and the planetary carrier 12 of the torque splitting device T all move in a body. As indicated by the shaded arrow in FIG. 3, the output torque of the engine is evenly distributed to the right and left front wheels WFL and WFR via the differential device D.

Figure 4:
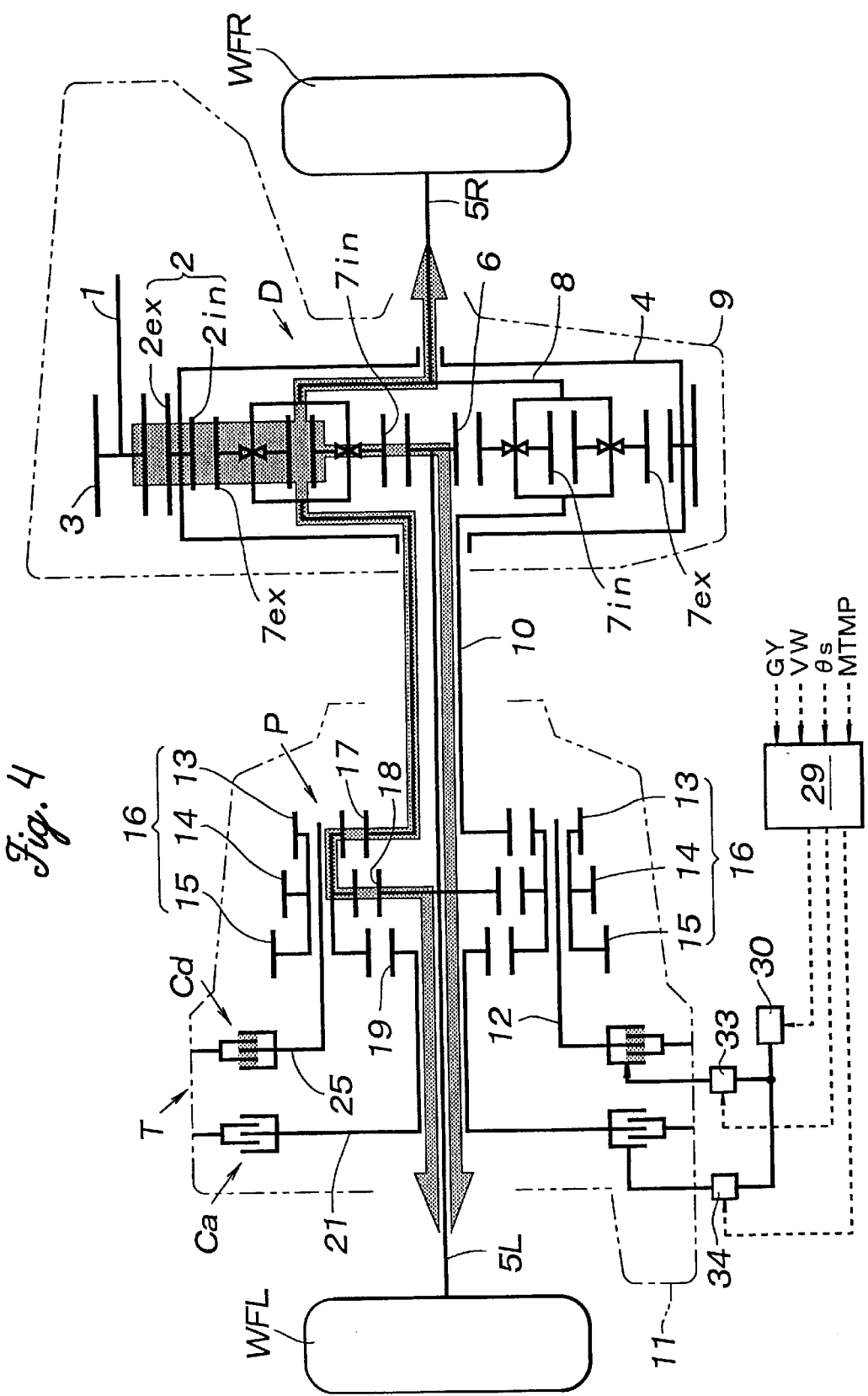
FIG. 4 is a view similar to FIG. 3 illustrating the control action during a right turn.

When the vehicle is turning right, as shown in FIG. 4, the deceleration clutch Cd is engaged so that the planetary carrier 12 is joined with the casing 11, and is thereby kept stationary. Because the left front wheel WFL which is integral with the left output shaft 5L (or the planetary carrier 8L of the differential device D) is coupled with the right front wheel WFR which is integral with the right output shaft 5R (or the planetary carrier 8R of the differential device D) via the meshing between the second sun gear 18 and the second pinion 14, and the meshing between the first pinion 13 and the first sun gear 17, the rotational speed NL of the left front wheel WFL is increased in speed over the rotational speed NR of the right front wheel WFR.

$$NL/NR = (Z4/Z3)(Z1/Z2) \qquad \text{(Equation 1)}$$

where

Z1: number of teeth of the first sun gear 17

Z2: number of teeth of the first pinion 13

Z3: number of teeth of the second sun gear 18

Z4: number of teeth of the second pinion 14

As described above, when the rotational speed NL of the left front wheel WFL is increased in speed over the rotational speed NR of the right front wheel WFR, as indicated by the shaded arrow in FIG. 4, a part of the torque distributed to the right front wheel WFR or the inner wheel from the differential device D is transmitted to the left front wheel WFL or the outer wheel.

When the planetary carrier 12 of the torque splitting device T is reduced in speed by partly engaging the deceleration clutch Cd instead of totally preventing the motion of the planetary carrier 12, the rotational speed NL of the left front wheel WFL is increased in speed over the rotational speed NR of the right front wheel WFR by a corresponding amount so that it is possible to change the amount of torque transmission from the right front wheel WFR or the inner wheel to the left front wheel WFL or the outer wheel at will.

Figure 5:
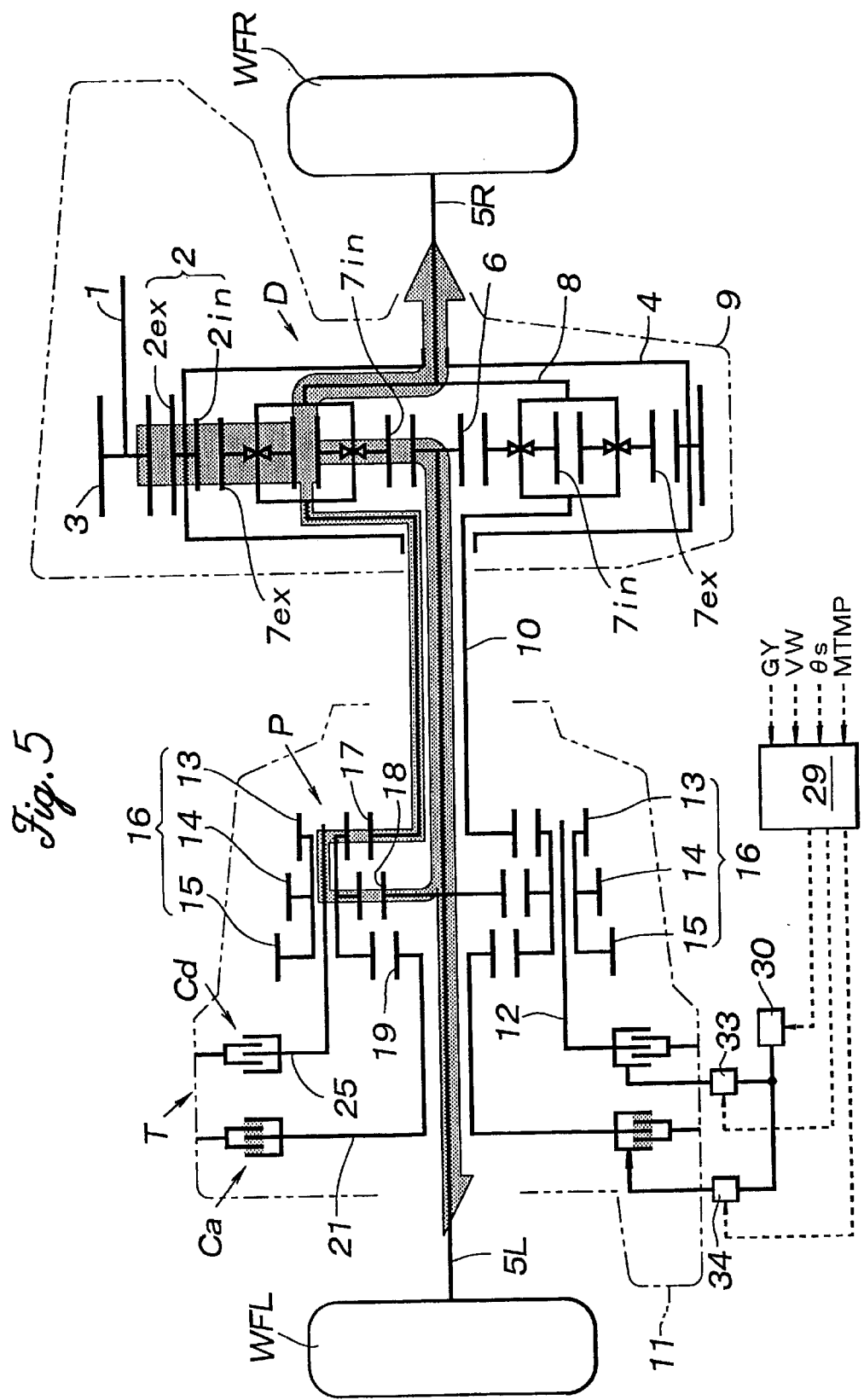
FIG. 5 is a view similar to FIG. 3 illustrating the control action during a left turn.

When the vehicle is turning left, as shown in FIG. 5, the acceleration clutch Ca is engaged so that the third sun gear 19 which is integral with the inner plate retaining member 21 of the acceleration clutch Ca is kept stationary. As a result, the triple pinion members 16 rotate around the center of the sun gears via the third pinion 15 meshing with the third sun gear 19, and the rotational speed of the planetary carrier 12 is increased over the rotational speed NL of the left front wheel WFL according to the following relationship.

$$NL/NR = [1-(Z5/Z6)(Z2/Z1)]/[1-(Z5/Z6)(Z4/Z3)] \qquad \text{(Equation 2)}$$

where

Z5: number of teeth of the third sun gear 19

Z6: number of teeth of the third pinion 15

As described above, when the rotational speed NR of the right front wheel WFR is increased in speed over the rotational speed NL of the left front wheel WFL, as indicated by the shaded arrow in FIG. 5, a part of the torque distributed to the left front wheel WFL or the inner wheel from the differential device D is transmitted to the right front wheel WFR or the outer wheel. In this case also, it is possible to change the amount of torque transmission from the left front wheel WFL to the right front wheel WFR at will by changing the engagement force of the acceleration clutch Ca.

According to the above described torque splitting device T, the operating response of the two clutches Ca and Cd depends on the viscosity of the actuating oil, and, in particular, the response of the clutches at the time of disengagement tends to drop under a low oil temperature condition. Therefore, when the steering wheel is brought back to the neutral position from a turning maneuver which involves a difference in the torques of the right and left wheels, the disengagement of the clutch tends to be delayed, thereby causing a discomfort to the vehicle operator.

Therefore, according to a first embodiment of the present invention, when computing the torque distribution ratio, the electronic control unit 29 takes into account a torque limiting coefficient which changes from 0 to 1.0 depending on the oil temperature so that the oil pressure target value for each of the clutches may be compensated for by multiplying the torque limiting coefficient to the basic torque distribution ratio.

Figure 6:
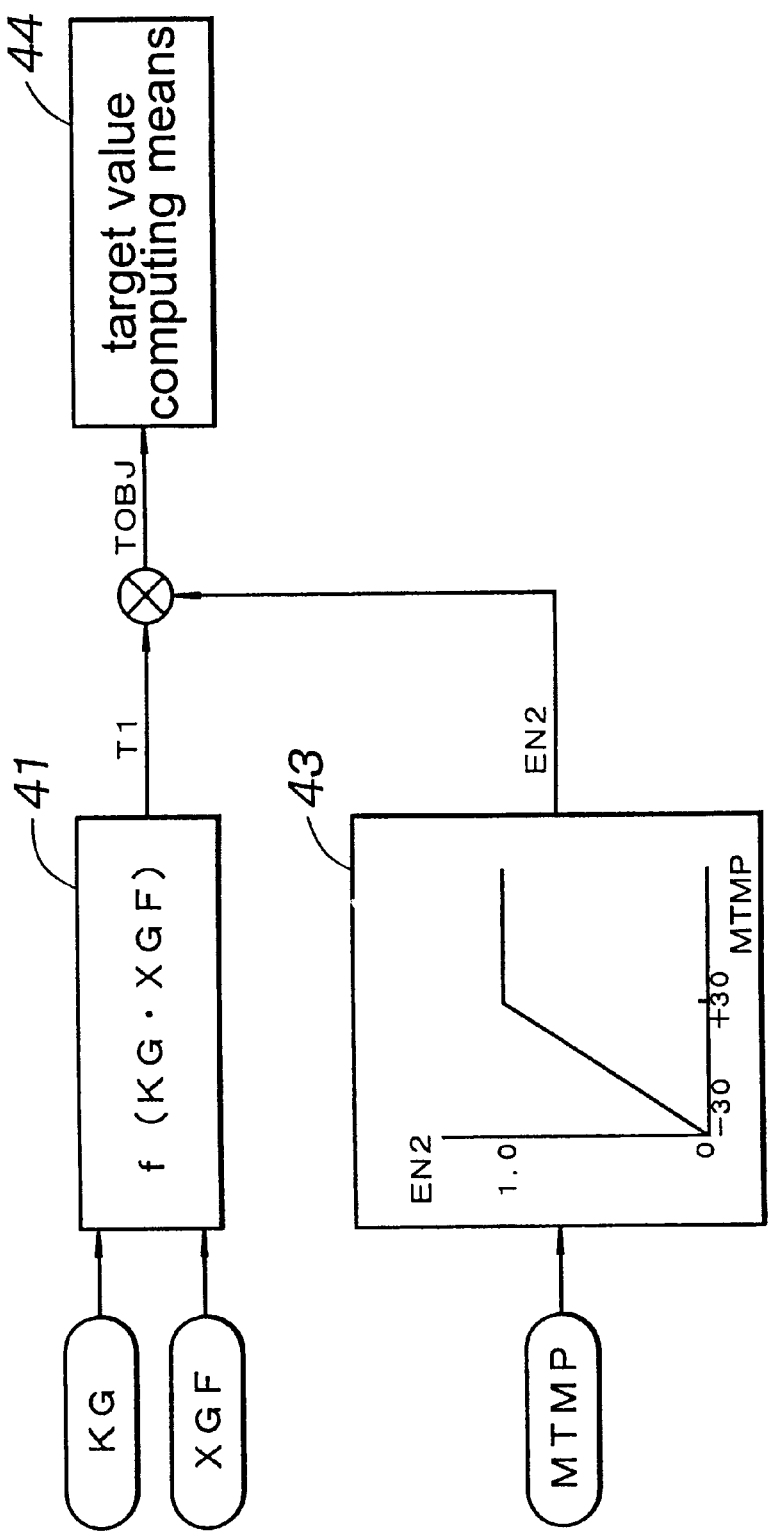
FIG. 6 is a block diagram of the first embodiment of the present invention showing the generation of the torque limiting coefficient, and application of the coefficient (EN2) to the target value for the torque distribution ratio (TOBJ)
Figure 7:
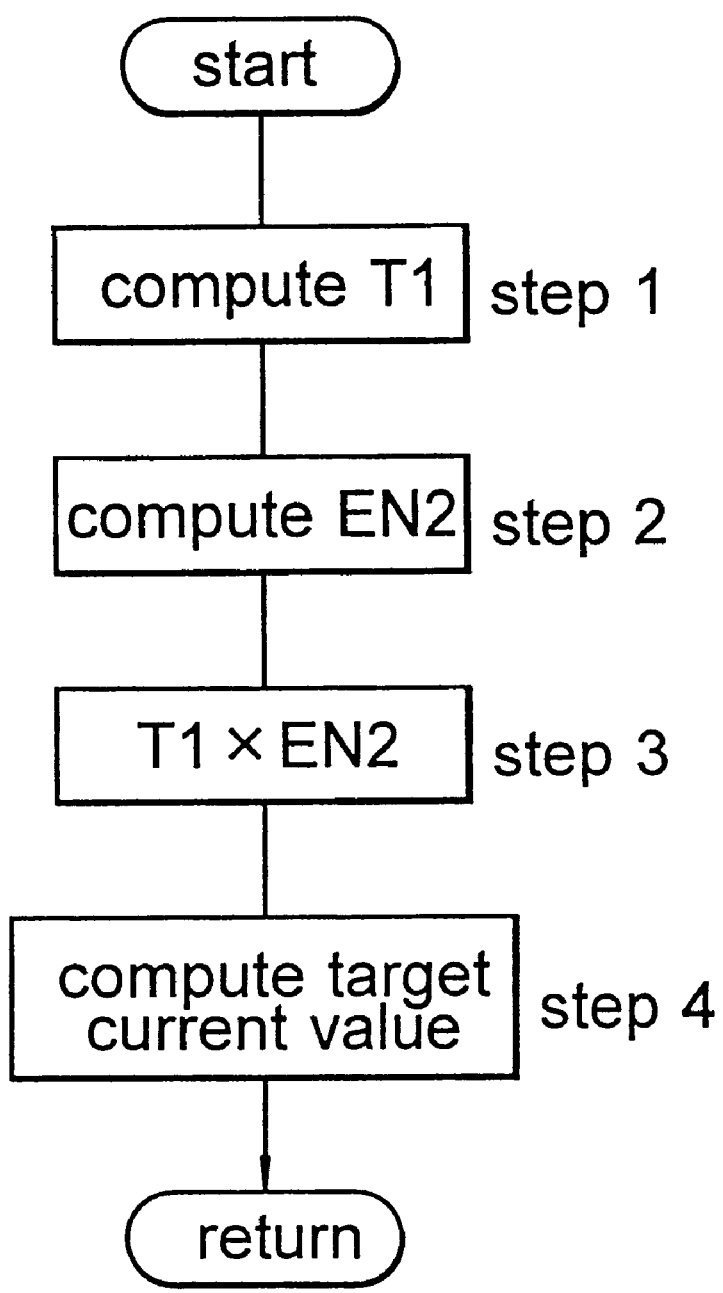
FIG. 7 is a flow chart showing the control action of the first embodiment of the present invention.

Now the operation of the electronic control unit 29 according to the first embodiment of the present invention is described in the following with reference to FIGS. 6 and 7.

Torque distribution ratio computing means 41 computes a torque distribution ratio (T1) from a turning amount (KG) and an axle drive torque (XGF) by using a mathematical function f (step 1). The turning amount KG is given by the following formula.

$$KG = YG + f(\theta s \times VW) \quad \text{(Equation 3)}$$

where

YG: lateral acceleration

θs: steering angle

VW: vehicle speed

A torque limiting coefficient (EN2) corresponding to the current oil temperature (MTMP) is obtained from a reference vehicle speed map 43 which is given by such a linear function which produces the value of 0 when the oil temperature is −30° C. and the value of 1.0 when the oil temperature is equal to or higher than 30° C. (step 2).

Then, a compensated torque distribution ratio (TOBJ) which is suited for the current operating condition of the vehicle is obtained by multiplying the torque limiting coefficient (EN2) to the torque distribution ratio (T1) in step 3. The current value which is required to be given to the pressure regulating valve 30 to achieve this oil pressure is computed by target current value computing means 44 (step 4) so that the oil pressure which is to be supplied to each of the clutches Ca and Cd is controlled by the pressure regulating valve 30 and the solenoid on/off valve 33 and 34 (FIG. 3).

Thus, according to the first embodiment of the present invention, when computing a torque distribution ratio, a torque limiting coefficient (EN2) which changes from 0 to 1.0 depending on the oil temperature is defined so that the control may be carried out by taking into account the sluggishness of the actuating oil when the oil is not warmed up. Therefore, the smoothness of the control can be ensured without being affected by the oil temperature.

Figure 8:
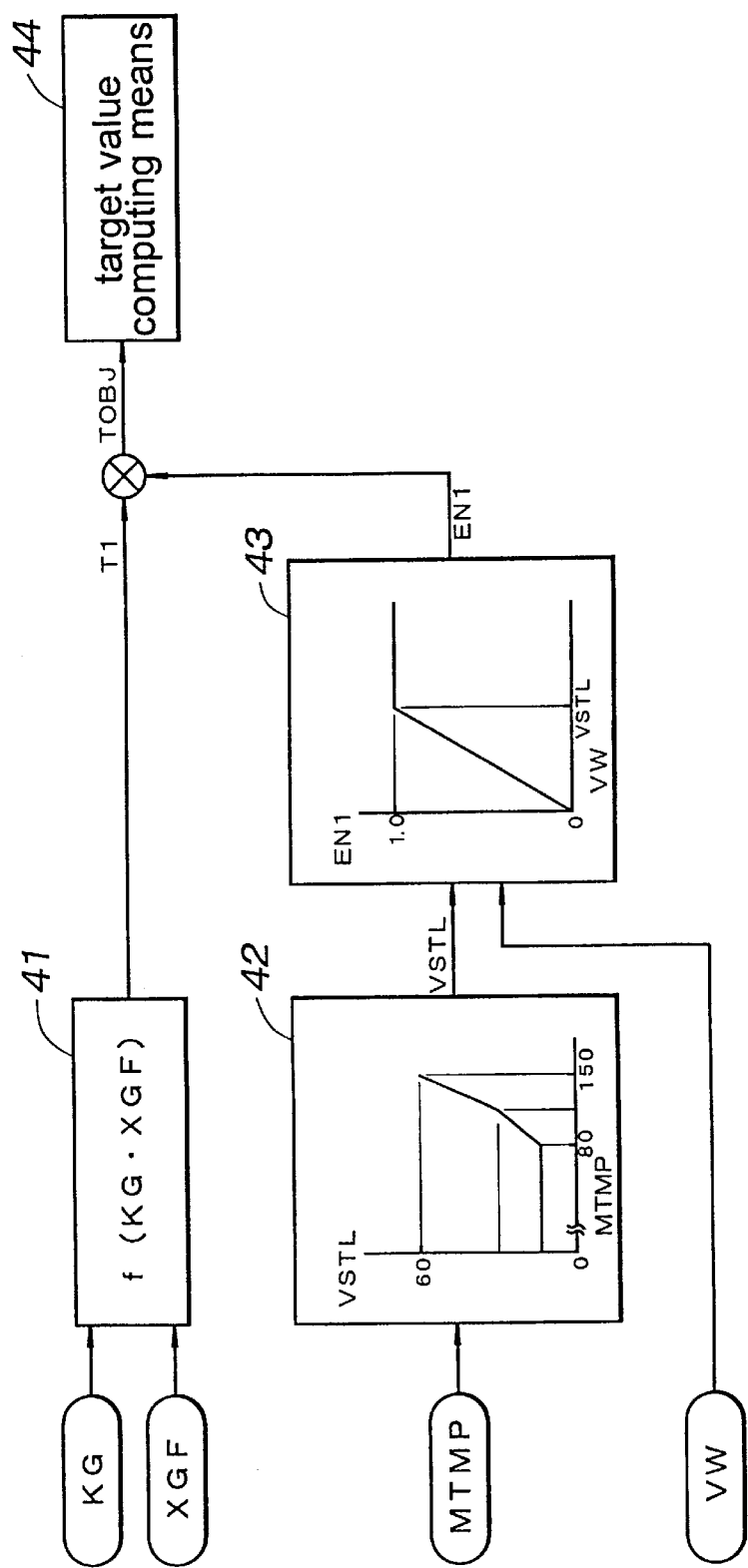
FIG. 8 is a block diagram of the second embodiment of the present invention showing the generation of the torque limiting coefficient, and application of the coefficient (EN1) to the target value for the torque distribution ratio (TOBJ)
Figure 9:
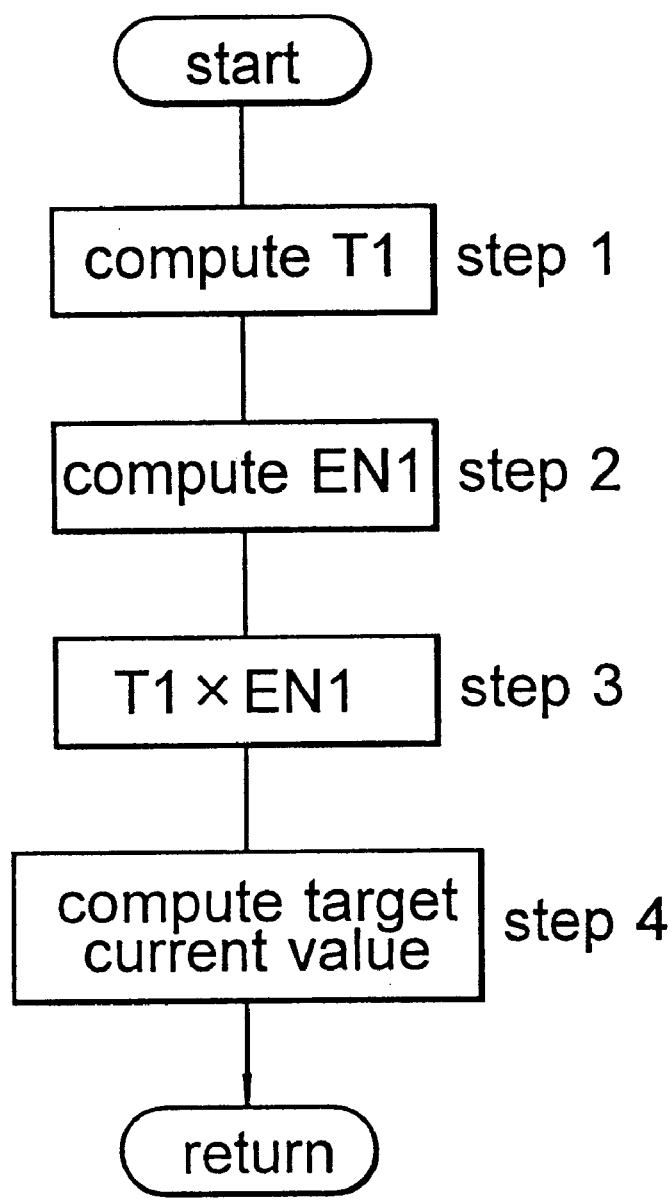
FIG. 9 is a flow chart showing the control action of the second embodiment of the present invention.
Figure 10:
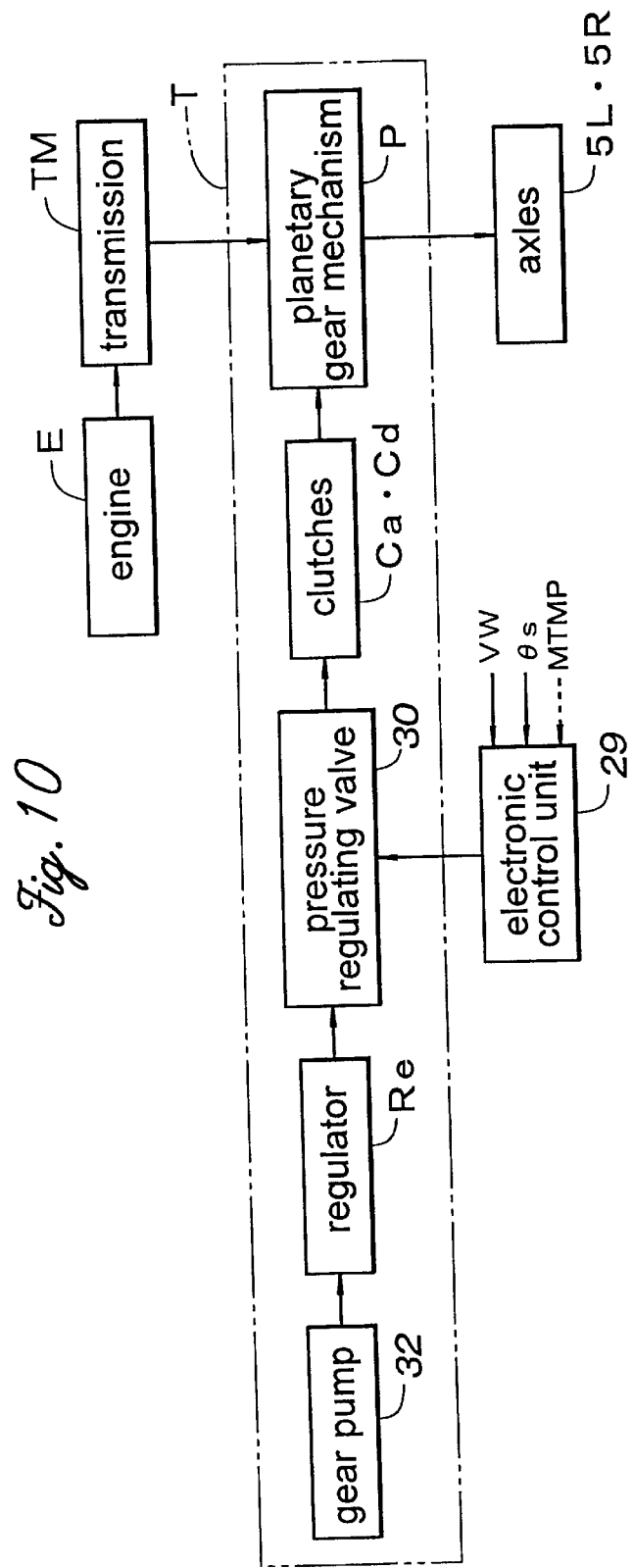
FIG. 10 is a block diagram showing the overall structure of a previously proposed torque splitting device to which the present invention is applied.

Now the operation of the electronic control unit 29 according to a second embodiment of the present invention is described in the following with reference to FIGS. 8 and 9. The second embodiment may comprise substantially identical hardware to that of the first embodiment so that reference should be made to FIGS. 1 to 5 as required for the understanding of the second embodiment. Also, in the description of the second embodiment, the parts corresponding to the first embodiment are denoted with like numerals.

According to the hardware of the above described torque splitting device T, the output of the gear pump 32 which controls the engagement forces of the two clutches Ca and Cd depends on the speed of actuating the gear pump 32. The actuating speed of the gear pump 32 in this case is proportional to the vehicle speed because the pump 32 is actuated by the output shaft 5L. Therefore, the oil pressure which is required for producing a prescribed engagement force may not be available in a low vehicle speed range. Also, the rotational speed versus flow rate property of a gear pump is normally significantly dependent on the oil temperature so that the rated oil pressure may not be produced from the pump when the oil temperature is excessively high and the viscosity of the oil is low. Therefore, when an oil pressure target value is supplied to the pressure regulating valve 30 so as to produce a required difference in the drive force between the right and left wheels of the vehicle as it makes a turn at a relatively low speed, the pressure available for engaging the clutch may be not be adequate, and the intended torque distribution may not be achieved. When the vehicle is accelerated under such a condition, the available pressure may abruptly increase so that the clutch may abruptly engage as soon as the output pressure of the pump increases beyond a certain level, thereby causing a discomfort to the vehicle operator.

Therefore, according to the second embodiment of the present invention, when computing the torque distribution ratio, the electronic control unit 29 takes into account a torque limiting coefficient which changes from 0 to 1.0 depending on the vehicle speed so that the oil pressure target value for each of the clutches may be compensated for by multiplying the torque limiting coefficient to the basic torque distribution ratio. Furthermore, the vehicle speed at which this coefficient reaches the value of 1.0 is made dependent on the oil temperature.

Torque distribution ratio computing means 41 computes a torque distribution ratio (T1) from a turning amount (KG) and an axle drive torque (XGF) by using a mathematical function f (step 1). The turning amount KG is given by Equation 3 which was given above.

A reference vehicle speed (VSTL) corresponding to the current oil temperature (MTMP) is obtained from a reference vehicle speed map 42, and a torque limiting coefficient (EN1) corresponding to the current vehicle speed (VW) is obtained from a torque limiting coefficient map 43 which gives the value of 1.0 at the reference vehicle speed (the coefficient being given as a linear equation such that the coefficient is 0 when the vehicle speed (VW) is 0, and 1.0 when the vehicle speed is equal to or greater than the prescribed value (VSTL) given by the reference vehicle speed map 42) (step 2). The prescribed value (VSTL) of the vehicle speed that is to be obtained from the reference vehicle speed map 42 is selected to be somewhat greater than the actual vehicle speed at which the pump is capable of producing the prescribed oil pressure.

Then, a compensated torque distribution ratio (TOBJ) which is suited for the current operating condition of the vehicle is obtained by multiplying the torque limiting coefficient (EN1) to the torque distribution ratio (T1) in step 3. The current value which is required to be given to the pressure regulating valve 30 to achieve this oil pressure is computed by target current value computing means 44 (step 4) so that the oil pressure which is to be supplied to each of the clutches Ca and Cd is controlled by the pressure regulating valve 30 and the solenoid on/off valve 33 and 34.

The rotational speed difference that will be produced when the clutches Ca and Cd are fully engaged should be selected at a value which is smaller than the rotational speed difference between the right and left axles that will be produced at the time of a maximum steering angle.

In case of a pump actuated by an electric motor, an accumulator for storing oil pressure becomes necessary to increase the effective pump capacity without increasing the size of the motor, and it is detrimental to a compact design. A pump which is actuated by a vehicle axle and is therefore dependent on vehicle speed allows a compact design, as compared with a motor driven pump, owing to the elimination of the need for an electric motor, and also contributes to an improvement in reliability owing to the absence of any electric wiring.

Thus, according to the second embodiment of the present invention, when computing a torque distribution ratio, a torque limiting coefficient which changes from 0 to 1.0 depending on the vehicle speed is defined, and the vehicle speed at which this coefficient reaches the value of 1.0 is made dependent on the oil temperature so that the control may be carried out within the range of available oil pressure when the vehicle is traveling at a low speed particularly under a high oil temperature condition. Therefore, because the control can be carried out in a continuous manner even when the vehicle is accelerating from a low speed, the smoothness of the control can be ensured. Also, because the control amount is limited in an extremely low speed range, in case of an extremely tight turn which may cause the rotational speed difference between the inner and outer wheels in the torque splitting control device to exceed an upper limit, the control action is limited in such a manner that the turning movement of the vehicle is prevented from being adversely interfered with by the torque splitting control.

Although the present invention has been described in terms of preferred embodiments thereof, it is obvious to a person skilled in the art that various alterations and modifications are possible without departing from the scope of the present invention which is set forth in the appended claims. For instance, in the above described embodiments, the present invention was applied to right and left torque splitting devices, but, as one can readily appreciate, it is equally applicable to front and rear torque splitting devices.

What we claim is:

1. A torque splitting device for distributing an input torque applied to an input member to a pair of output members at an adjustable distribution ratio, comprising:

a torque splitting mechanism including at least one hydraulically actuated clutch for controlling a torque distribution ratio to the two output members;

an oil circuit for supplying actuating oil to said clutch including a regulating valve for controlling a pressure of the actuating oil supplied to said clutch;

a sensor for detecting the actuating oil temperature; and a control unit for controlling said torque distribution ratio via said regulating valve according to a prescribed control schedule;

wherein said control unit is adapted to modify said control schedule according to an output signal from said sensor such that a target value for the pressure of the actuating oil supplied to said clutch is reduced from a normal value when the oil temperature is lower than a normal value; and wherein said target value is a function of turning amount, axle drive torque, and a coefficient, the coefficient being substantially equal to one when the oil temperature is equal to or greater than a first temperature, the coefficient being substantially equal to zero when the oil temperature is equal to or less than a second temperature, and the coefficient increases approximately linearly as the oil temperature increases from the second temperature to the first temperature.

2. A torque splitting device for distributing an input torque applied to an input member to a pair of output members at an adjustable distribution ratio, comprising:

a torque splitting mechanism including at least one hydraulically actuated clutch for controlling a torque distribution ratio to the two output members;

an oil circuit for supplying actuating oil to said clutch including a regulating valve for controlling a pressure of the actuating oil supplied to said clutch;

a sensor for detecting an actuating property of the actuating oil;

a control unit for controlling said torque distribution ratio via said regulating valve according to a prescribed control schedule; and a pump which is actuated at a variable speed to provide a pressure source for said oil circuit;

wherein said control unit is adapted to modify said control schedule according to an output signal from said sensor such that a target value for the pressure of the actuating oil supplied to said clutch is reduced from a normal value when the actuating speed of said pump is lower than a normal value; and wherein said target value of the actuating oil pressure is a function of turning amount, axle drive torque, and a coefficient, the coefficient being substantially proportional to the vehicle speed when the vehicle speed is below a prescribed speed and substantially equal to one when the vehicle speed is equal to or higher than the prescribed speed, and said prescribed speed is increased as a function of the temperature of the actuating oil when the temperature of the actuating oil is higher than a reference value.

* * * * *